United States Patent
Olla

(10) Patent No.: US 12,475,809 B2
(45) Date of Patent: Nov. 18, 2025

(54) ARTIFICIAL INTELLIGENCE DRIVEN EDUCATIONAL METHOD

(71) Applicant: Phillip Olla, Detroit, MI (US)

(72) Inventor: Phillip Olla, Detroit, MI (US)

( * ) Notice: Subject to any disclaimer, the term of this patent is extended or adjusted under 35 U.S.C. 154(b) by 0 days.

(21) Appl. No.: 18/663,142

(22) Filed: May 14, 2024

(65) Prior Publication Data

US 2024/0412654 A1 Dec. 12, 2024

Related U.S. Application Data

(60) Provisional application No. 63/506,439, filed on Jun. 6, 2023.

(51) Int. Cl.
| | |
|---|---|
| *G09B 7/00* | (2006.01) |
| *G06N 20/00* | (2019.01) |
| *G06Q 50/20* | (2012.01) |
| *G09B 7/02* | (2006.01) |

(52) U.S. Cl.
CPC .............. *G09B 7/00* (2013.01); *G06N 20/00* (2019.01); *G06Q 50/20* (2013.01); *G09B 7/02* (2013.01)

(58) Field of Classification Search
CPC . G06N 20/00; G09B 7/00; G09B 7/02; G06Q 50/20
See application file for complete search history.

(56) References Cited

U.S. PATENT DOCUMENTS

| | | | | |
|---|---|---|---|---|
| 2006/0024654 | A1* | 2/2006 | Goodkovsky | G09B 7/02 434/350 |
| 2016/0358489 | A1* | 12/2016 | Canter | G06N 5/04 |
| 2019/0236967 | A1* | 8/2019 | Dohring | G09B 19/00 |
| 2020/0357296 | A1* | 11/2020 | Sharma | G06Q 50/2057 |
| 2022/0044583 | A1* | 2/2022 | Sherman | G06F 16/2379 |
| 2022/0406208 | A1* | 12/2022 | Ram | G09B 5/04 |
| 2023/0297888 | A1* | 9/2023 | Delisle | G06N 20/00 706/12 |
| 2023/0360549 | A1* | 11/2023 | LeBlanc | G09B 5/02 |
| 2024/0379019 | A1* | 11/2024 | Naufel | G06N 3/0895 |

* cited by examiner

*Primary Examiner* — Jack Yip
(74) *Attorney, Agent, or Firm* — MaxGoLaw PLLC

(57) ABSTRACT

A method for providing personalized educational content includes capturing a learner's initial learning preferences, styles, and knowledge to generate an AI Key unique to the learner; presenting the learner with educational material from an educator; dynamically updating the AI Key based on continuous learner interactions with the educational material and the learner's progress; utilizing the AI Key to inform AI-driven educational tools and services and an educator about the learner's personalized learning profile; and iteratively updating the educational material using the AI-driven educational tools and services and the educator's input to tailor the updated educational material to the learner based on the dynamically updated AI key. The method additionally prompts the educator to create or provide additional educational content tailored to the learner's personalized learning profile, the learner's interactions with the educational material, and the learner's progress. The educational material is generated by the educator or with assistance of AI.

20 Claims, 1 Drawing Sheet

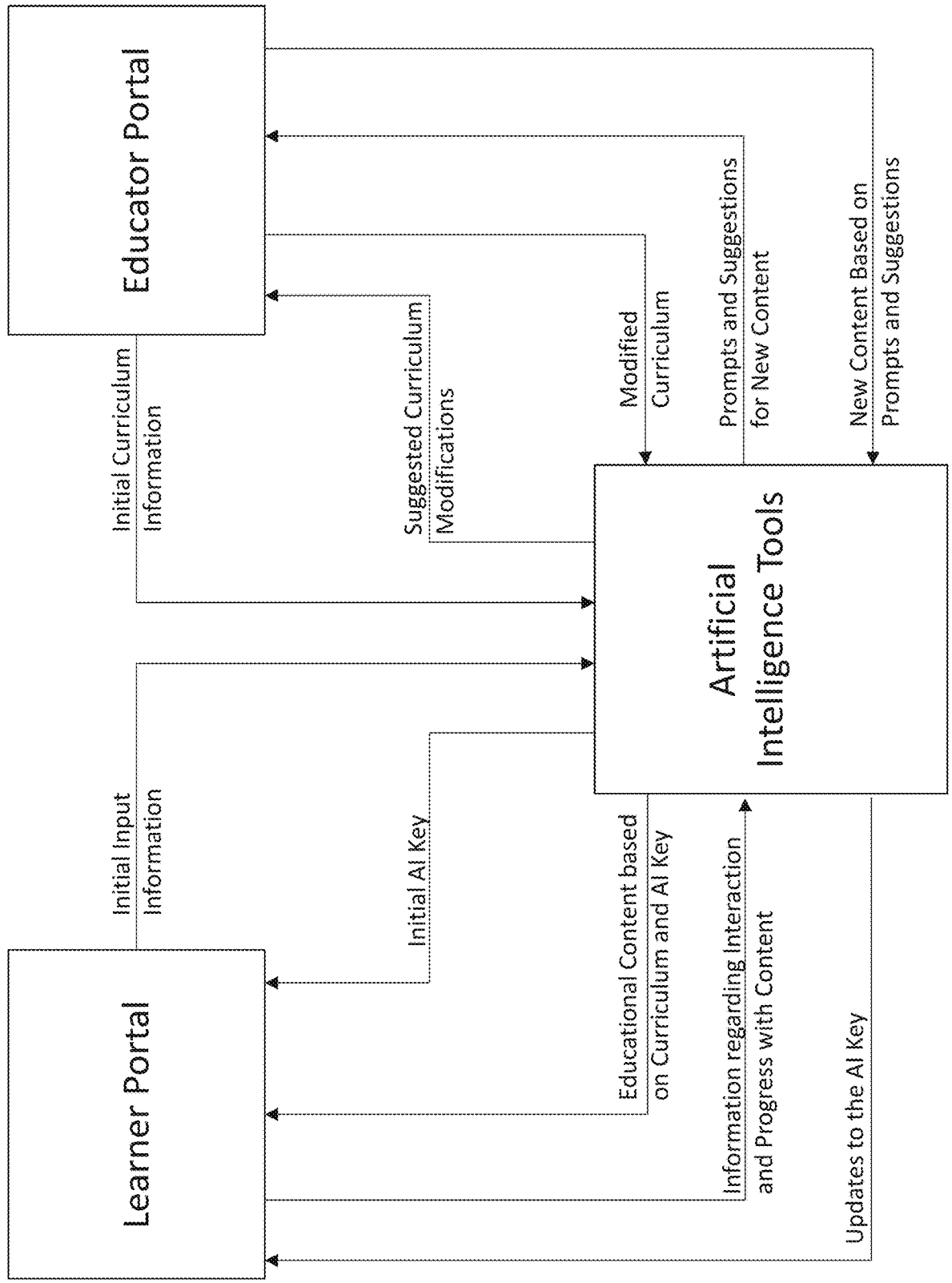

ARTIFICIAL INTELLIGENCE DRIVEN EDUCATIONAL METHOD

CROSS-REFERENCE TO RELATED APPLICATION

This application claims priority of U.S. Provisional Patent Application Ser. No. 63/506,439 filed Jun. 6, 2023, which is incorporated herein by reference.

FIELD OF THE INVENTION

The present invention in general relates to an electronic education method; and in particular to an artificial intelligence driven electronic educational method that adapts and customizes to a learner's particular learning style, preferences, progress, and acquired knowledge.

BACKGROUND OF THE INVENTION

Formal education and educational techniques, or pedagogy, date back thousands of years. As the demands of society and the state of knowledge evolves, educational institutions and pedagogy have adapted to the occasion. For example, social norms and educational practices rooted in the Agricultural Revolution were updated over the last 300-years in response to the Industrial Revolution. Today, the world is being transformed by the Information Technology (IT) Revolution among other scientifically-driven trends. This has already impacted most aspects of modern life. But educational practices are lagging behind and have mostly only adapted IT-tools and techniques for peripheral tasks like record keeping. Learning management systems (LMS) are still in their infancy and have failed to transform the educational experience. Conventional learning management systems typically facilitate record keeping and notifications but provide little insight about students because the data tracked is information-poor, namely, it tends to be limited to observations of a single, final submission per assignment, a performance assessment or grade of that submission and the time of submission. Effective use of IT and IT-enabled pedagogy within or as a supplement to the classroom is still lacking.

Educational institutions and pedagogy still need further improvements to take advantage of available digital technologies and best practices. For example, educational curriculums remain rooted in traditional, one size fits all models. These traditional models fail to account for different learners having different skill sets, abilities, learning styles, and other factors that contribute to disparate outcomes irrespective of knowledge, skill or talent.

Thus, there is a need for suitable systems and methods for tailoring an academic program for a student that considers the individual student's learning styles, habits, and preferences and adapts the curriculum and teaching strategies using machine or artificial intelligence concepts and generate improved or optimized learning content or outcomes in response to the student's engagement, learning progress, and acquired knowledge.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

The FIGURE is a flowchart showing interactions between an educator portal and a learner portal and the AI tools according to embodiments of the present invention.

SUMMARY OF THE INVENTION

The present invention provides a method for providing personalized and customizable educational content. The method includes capturing a learner's initial learning preferences, styles, and knowledge to generate an AI Key unique to the learner; presenting the learner with educational material from an educator; dynamically updating the AI Key based on continuous learner interactions with the educational material and the learner's progress; utilizing the AI Key to inform AI-driven educational tools and services and an educator about the learner's personalized learning profile; and iteratively updating the educational material using the AI-driven educational tools and services and the educator's input to tailor the updated educational material to the learner based on the dynamically updated AI key. The educational material is generated by the educator alone or with the assistance of AI. The method additionally prompts the educator to create or provide additional educational content tailored to the learner's personalized learning profile, the learner's interactions with the educational material, and the learner's progress.

DESCRIPTION OF THE INVENTION

The present invention has utility as an artificial intelligence (AI) driven electronic educational method that adapts and customizes to a learner's particular learning style, preferences, progress, and acquired knowledge. According to embodiments, the method includes an adaptive learning key unique to a given learner. This learning key allows seamless transition between various AI enhanced educational platforms within the overall AI driven educational system and method.

The present invention will now be described with reference to the following embodiments. A schematic of the present invention according to certain inventive embodiments is provided graphically with respect to the FIGURE. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant FIGURE of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Embodiments of the invention provide a complete suite of applications (apps) for real-time state of the art AI driven electronic educational method via networked computer systems and cloud-based mobile devices for educators, learners, and other stakeholders. Embodiments of the inventive method are designed for mobile phone and tablet computer platforms on the iOS and Android operating systems as well as traditional desktops and laptops running Windows, Apple OSX, and Chrome OS. The system and method include a program application (app), secure data warehousing, and real-time information availability. The suite of cloud based or networked based apps of embodiments of the invention include an educator portal, a learner portal, and various AI enhanced educational platforms.

According to embodiments, the educator portal includes a graphical user interface that facilitates an educator's use and interaction with the system for executing the method. According to embodiments, an educator sets up a profile within the system using a username and password. Within each educator profile, the educator is able to set up a course section for each course taught by that educator. The educator is able to assign each course section to a given educational platform based on which educational platform is best suited for the subject matter of the course or preferences of the educator. According to embodiments, each course section within an educator profile includes a list of learners or students that are participating in a given course taught by the educator. The educator has the ability to access review a unique learning key of each learner in a given course, as discussed below.

According to embodiments, for each course within an educator profile the educator is able to establish a course curriculum. According to embodiments, the educator can enter detailed course curriculums or can take advantage of an AI based curriculum generator within the method. Using the AI based curriculum generator, an educator will input some basic information regarding the course, such as the subject matter, the educational level of the learners, the length of time available for teaching the subject matter, a textbook or other materials that will be used, etc. In response to these inputs from the educator and based on the learning keys of the learners in a particular course (discussed below), the AI based curriculum generator generates a proposed curriculum that is a best fit for the subject matter, teaching style, and unique learning characteristics of the learners for a particular course. The AI based curriculum generator outputs this proposed curriculum for the educator's review, revisions, and approval.

Over the duration of the course, within the educator profile, the educator is able to review the progress of the curriculum for a given course as a whole and also of each learner enrolled in a given course. The system provides a visual timeline of the curriculum and a percentage of the curriculum that has been taught. However, unlike traditional education methods where the curriculum trudges ahead irrespective to mastery of the subject matter, according to embodiments of the inventive method, the AI curriculum generator reviews the mastery of the subject matter for each learner in a given course and provides not only feedback to the educator but also suggests revisions to the curriculum as needed. These revisions can then be approved, denied, or modified by the educator. Advantageously, the in-progress curriculum revisions can be for individual learners to ensure mastery of the subject matter of the course for that particular learner. These individualized modifications thereby create an AI based individualized approach to teaching that has never before been available in a standard classroom based setting.

According to embodiments, the learner portal includes a graphical user interface that facilitates a learner's use and interaction with the system. According to embodiments, a learner sets up a profile within the method using a username and password. Next, a learner interacts with the system to create an initial profile that captures their learning styles, preferences, and any existing knowledge or skills. This profile is encapsulated as a personalized generative AI key. The Personalized Generative AI Key is designed to revolutionize personalized learning by encapsulating the essence of a learner's study habits, acquired knowledge, and preferred learning styles, thereby facilitating a seamless and adaptive human-AI educational experience. This Personalized Generative AI Key represents a groundbreaking approach to personalizing education, leveraging generative AI to ensure that every learner benefits from an educational journey that is as unique as their own learning style and history. The personalized generative AI key evolves with a learner's educational essence involves a series of steps, combining direct input from the learner with inferred data through interaction analytics. These AI keys serve as personal learning passports across various educational platforms and tools, ensuring a highly personalized and consistent learning experience that leverages prior knowledge and adapts to each learner's unique way of learning. The key for a given user acts as a passport to personalized learning experiences, carrying detailed profiles of their learning preferences, styles, and historical data. As the learner engages with various educational content and tools, the method dynamically updates the AI Key with new data, refining the learner's profile for ongoing personalization. The method continuously updates the AI Key based on learner interactions, newly acquired knowledge, and evolving preferences, ensuring the learning experience remains aligned with the learner's current needs and goals. According to embodiments, the updated AI Key informs AI-driven educational services and tools within the system about the learner's preferences and needs, enabling tailored interactions and content delivery that resonate with the learner's current state. This facilitates a nuanced understanding of each learner for AI-driven educational tools and services, allowing for more meaningful and effective interactions that enhance the learning journey. Furthermore, the Generative AI Key allows learners to access different AI-enhanced educational platforms within the system, transferring their personalized learning essence seamlessly, and enabling continuous, adaptive learning experiences. This enables learners to carry their personalized AI Key across different educational platforms and tools, ensuring a cohesive and uninterrupted learning experience that builds upon prior knowledge and preferences.

According to embodiments, the Personalized Generative AI key is created when a leaner is presented with a series of survey questions designed to gather explicit information about their preferred learning styles (visual, auditory, kinesthetic, etc.), interests including specific subjects or topics the learner is interested in or wishes to avoid, skill levels including existing knowledge or proficiency in specific subject areas or skills, engagement patterns such as preferred content types, session lengths, and learning schedules, and performance data such as outcomes from assessments and quizzes to gauge mastery and areas for improvement. Example of such questions include, describe your preferred method of learning new information (reading, watching, doing); rate your interest levels in various subjects (math, science, literature); and list any skills or knowledge areas where you feel particularly strong or experienced.

Within each learner profile, the learner is able to join a course section for each course that the learner is participating in, each course having been set up by an educator teaching that course, as described above.

This advanced method then uses generative AI to dynamically adapt and evolve the unique AI key for each user based on the individual's interactions, learning progress, and preferences. That is, as the learner begins to interact with the platform, the method analyzes their behavior to infer additional preferences and learning patterns. This includes which types of content are engaged with most frequently, the time spent on different activities, and performance metrics from quizzes or assessments. For example, the system may note that a given learner has a preference for short, concise articles over longer texts, which could indicate a learner's inclination towards bite-sized learning. As another example, the system may note that a particular student has higher engagement with interactive simulations over traditional lectures, which could suggest a kinesthetic learning preference.

According to embodiments, the personalized AI key is continuously updated in real-time based on ongoing learner interactions, assessments, and feedback. This ensures that the learner's profile evolves to reflect their current interests, abilities, and learning preferences. These updates are based on performance analytics and engagement metrics as well as periodic surveys to capture changes in interests or new skills acquired.

Based on the ever-evolving personalized AI key, learners receive personalized content and learning experiences based on their GenAI Key profile. Learners are also encouraged to provide feedback on the relevance and effectiveness of the content, which is used to further refine their profile. Refinement tools include feedback surveys on content relevance and learning experience satisfaction as well as an option to manually update preferences and interests through the learner profile GUI. The method additionally refines the AI key through inferred information, including detailed engagement patterns, such as favorite times for studying or content formats that maximize retention, unconscious preferences, e.g., a tendency to engage more with certain types of interactive content, and progress and mastery in new subjects or skills based on assessment performances. By combining direct input with inferred analytics, the GenAI Key becomes a dynamic, evolving representation of the learner's educational profile, enabling personalized learning pathways that adapt over time to meet each learner's unique needs and preferences.

By embedding the essence of a learner's educational journey and preferences within a Personalized Generative AI Key, this method not only personalizes the learning experience to an unprecedented degree but also bridges the gap between human and AI, fostering a more intuitive, effective, and satisfying educational interaction.

According to embodiments, as a learner interacts with an AI enhanced educational platform of the inventive system, the method employs sophisticated artificial intelligence algorithms to continuously analyze learner data, including interactions, performance, and feedback, to tailor the learning experience uniquely to each individual learner. This dynamic personalization ensures that the learning content, pace, challenges, and support mechanisms are optimally aligned with the learner's current abilities, learning style, and progression. This component of the invention revolutionizes e-learning through the use of AI-driven adaptive learning and personalization techniques. According to embodiments, the method utilizes AI algorithms to adjust the learning content and pathways that are presented to a learner in an AI enhanced learning platform in real-time, ensuring the educational experience remains challenging yet achievable for each learner. The method additionally offers tailored feedback and support mechanisms, providing personalized guidance, encouragement, and interventions based on the learner's performance and engagement patterns. According to embodiments, the learner is able to accept or reject these suggestions for modifications. According to embodiments, the method additionally employs predictive analytics to foresee potential learning trajectories, allowing for preemptive customization of content to address future learning needs and goals. According to embodiments, the preemptive customizations are presented to the learner and/or the educator in an interactive visual format on the respective GUIs and the preemptive customizations can be further customized or modified by either the learner and/or the educator. Additionally, embodiments of the inventive method leverages AI to enhance learner engagement and motivation by adapting content to match interests, celebrating achievements, and encouraging exploration. As noted above, the inventive method collects comprehensive data on each learner's interactions, progress, and feedback, which AI algorithms analyze to understand learning behaviors and needs. Based on the analysis, the method dynamically adjusts the learning content, difficulty levels, and presentation styles to best suit the learner's current state. Then, the method continuously monitors the learner's progress, utilizing new data to further refine and personalize the learning experience. Furthermore, the inventive method utilizes predictive models to anticipate future learning challenges and interests, preemptively adjusting the learning path and providing targeted interventions as necessary. This AI-driven approach to adaptive learning and personalization significantly enhances the effectiveness and engagement of e-learning platforms, offering a highly tailored educational journey that evolves with each learner's individual needs, preferences, and goals.

As noted above, the learning preferences of a given learner are integrated into the learner's unique AI key, providing a personalized learning experience that adapts to the diverse ways individuals perceive, process, and engage with information. By recognizing and catering to the unique combination of verbal-linguistic, logical-mathematical, spatial, musical, bodily-kinesthetic, interpersonal, intrapersonal, and naturalistic intelligences, as well as specific learning preferences (such as visual, auditory, reading/writing, and kinesthetic), the method ensures that educational content is delivered in a manner most conducive to each learner's natural inclinations and abilities. This feature of the present invention utilizes the initial assessments of a learner inputted by the learner upon profile creation and ongoing interaction data to identify each learner's dominant intelligences and preferred learning styles. Then, the method dynamically adjusts the presentation of educational material to match the detected intelligences and preferences, incorporating suitable media, activities, and interaction modes, automatically tailoring the material to align with the learner's profile, selecting the types of media, complexity of information, and interaction methods that best suit their identified strengths and preferences. The learner interactions with the content are closely monitored to assess engagement levels and learning outcomes, providing data for further refinement of the learner profile. Using AI, the method continuously refines the understanding of a learner's preferences and intelligences based on engagement metrics and feedback, fine-tuning the adaptiveness of the content delivery. According to embodiments, the information gathered by the AI is periodically reported to the educator for assessment and modification if desired. Based on continuous monitoring, the method, with review and input from the educator, iteratively enhances the adaptiveness of the content, ensuring an increasingly personalized learning experience over time. If at any point the educator feels it is necessary to further modify the material presented or the learning experience for a particular learner, the educator can add input, thereby modifying or overriding the AI. By focusing on the integration of Multiple Intelligences and Learning Preferences, this component of the invention acknowledges the diversity of learning processes and optimizes e-learning platforms to cater to this diversity, thereby enhancing the effectiveness of digital education.

According to embodiments, the inventive method includes Knowledge Concept Graphs (KCG) and Cognitive Blueprints (CB) to enhance personalized learning experiences. The KCGs are dynamic, visual representations of a learner's understanding, mastery, and interconnections among various educational concepts. Cognitive Blueprints extend this concept by providing a unique cognitive profile for each learner, highlighting strengths, areas for improvement, and how concepts are cognitively organized and related. The KCGs and the CBs are available to a learner via the learner's GUI within the learner's profile of the learner portal. According to some embodiments, an educator also has access to a learner's KCGs and CBs via the educator's GUI in the educator portal when that learner is enrolled in course taught by a given educator. An initial KCG and CB are generated for a given learner during the initial assessment phase when a learner sets up their profile, where their knowledge base and preferences are mapped to create the first iteration of the KCG and CB. As learners engage with the system, data on their interactions, progress, and feedback are continuously collected and analyzed. The learner's KCG and CB are dynamically updated based on the latest data, reflecting new learnings, improved mastery, and any changes in cognitive organization or learning preferences. These updated KCGs and CBs are reported to an educator of a course in which the learner is enrolled for review and for any modification based on the educator's observations of that learner. Based on the updated KCG and CB, the system, in conjunction with the educator, adapts the learning content and methodologies, recommending personalized learning paths and resources. Thus, the KCGs are automatically and continuously updated based on learner interactions, assessment outcomes, and feedback, visually mapping the learner's mastery over various subjects and topics and develops a CB for each learner, illustrating their unique cognitive landscape, including preferred learning paths, strengths, and areas needing reinforcement. The method then uses insights from the KCG and CB to tailor educational content, suggest learning activities, and provide recommendations that align with the learner's cognitive structure and learning preferences. This aspect of the invention represents a significant innovation in personalized e-learning, offering a sophisticated approach to dynamically adapt educational content and strategies based on a deep understanding of each learner's cognitive landscape and learning journey.

Embodiments of the inventive AI driven educational system include a role-based analytics and customized feedback system within the e-learning environment. It intricately analyzes data specific to the roles of users-learners/students, educators, and administrators—and provides tailored analytics and feedback. This personalized approach enables a more effective and insightful learning and teaching experience, fostering enhanced educational outcomes. According to embodiments, the role-based analytics and customized feedback system differentiates analytics and feedback based on user roles, offering learners personalized progress reports, educators insights into course and learner performance, and administrators an overview of educational effectiveness and engagement across the platform. The role-based analytics and customized feedback system leverages artificial intelligence to generate personalized feedback for learners and educators, highlighting achievements, areas for improvement, and recommended next steps, thereby enhancing the learning journey. The educator is able to review and modify these recommended next steps. Based on analytics, the method provides adaptive recommendations for course content, learning strategies, and resources, tailored to the learner's progress, preferences, and performance, the educator being able to also provide feedback based on the AI generated recommendations. This part of the method empowers educators with detailed analytics on learner engagement, performance trends, and learning outcomes, supporting informed decisions regarding curriculum adjustments and teaching methodologies. As noted previously, the method gathers comprehensive interaction and performance data from users, analyzing it with sophisticated AI algorithms to derive meaningful insights tailored to the specific needs and roles of learners, educators, and administrators. Then, the role-based analytics and customized feedback system automatically generates personalized feedback for students based on their analytics, focusing on constructive and motivational insights to guide their learning path. This feedback provides educators and learners with adaptive recommendations for improving learning experiences, including suggested content adjustments, learning resources, and methodologies. The system then delivers role-based performance reports and dashboards, enabling users to easily access relevant analytics and insights, fostering a deeper understanding of educational achievements and challenges. This role-based analytics and customized feedback system marks a significant leap towards personalizing the e-learning experience, making educational content more responsive and tailored to the unique needs of every participant in the learning ecosystem.

Some embodiments of the inventive AI driven educational method include a value-based learning system (VBLS) that introduces a revolutionary approach to compensating educational content creators, emphasizing the quality and impact of their work on learner outcomes. This evaluates student feedback, learning outcomes, competencies gained, skills demonstrated, and assessment results to determine fair compensation for authors, motivating the creation of high-quality, impactful educational content. With this feature of the invention, authors are compensated not just based on sales or downloads but on the measurable impact their content has on learners, such as improvements in knowledge, skills, and satisfaction. The method additionally provides useful insights to the educators/creators as far as what content is most beneficial for learners, allowing educators/creators to tailor their content for the most benefit, thereby securing financial compensation for the educator and also enabling enhanced learning for the learners. This feature of the invention utilizes artificial intelligence to aggregate and analyze feedback from learners, as well as data from assessments and interactive elements within the educational content, to assess its effectiveness. A variety of factors are considered to determine content impact, including direct learner feedback, engagement metrics, performance improvements, and the development of critical thinking skills. The VBLS provides a transparent framework for authors to understand how their compensation is calculated, encouraging continuous improvement and innovation in educational content creation. Upon a learner completing a course or educational material, the method collects data on learner engagement, assessment performance, and direct feedback. The AI module analyzes the collected data to evaluate the educational content's impact on learning outcomes and student satisfaction. Based on the AI evaluation, the author's compensation is calculated, factoring in the predefined metrics for impact and effectiveness. Authors then receive detailed feedback on the performance of their content, along with compensation, providing insights into areas for improvement and the aspects most valued by learners. The Value-Based Learning System represents a shift towards recognizing and rewarding the true value of educational content, encouraging authors to focus on creating materials that genuinely enhance learning and understanding.

Some embodiments of the AI driven educational method include an Interactive Book Publishing Model (IBPM), which represents an innovative approach to educational content delivery, integrating Artificial Intelligence (AI) to provide a dynamic and engaging learning experience through digital books. This model transcends traditional e-learning materials by embedding interactive elements directly into the content, including multimedia enhancements, quizzes, exercises, simulations, and interactive assessments. Using the IBPM, AI algorithms analyze learner interactions, performance, and preferences to tailor the embedded interactive elements in real-time, ensuring the content remains relevant and engaging for each learner. The IBPM then seamlessly incorporates videos, animations, and audio narrations within the text, enriching the learning experience and catering to various learning styles. An additional feature is that the IBPM makes suggestions to the educator for content that the educator could create to add to the learning experience. Thus, the educator is able to create new educational content that based on the AI analysis will enhance the learning experience. This may be for an entire class of learners or it may be focused on a single learner that based on AI analysis is in need of additional help in order to master a particular knowledge set. The IBPM also includes interactive quizzes and exercises that are dynamically adjusted based on the learner's progress and areas of difficulty, promoting mastery learning. According to embodiments, the IBPM incorporates simulations and gamified elements that are directly relevant to the book's content, enhancing understanding through practical application. Initially, authors/educators upload their educational content to the platform, where it is processed and formatted for interactive integration. The method prompts the educator/author to review the processed and formatted materials for any revisions that the author/educator would like to see. The AI engine analyzes the content structure and identifies key concepts and learning objectives for enhancement with interactive elements. The method then prompts the educator/author to create additional content for these enhancements and interactive elements. The AI then embeds these multimedia, quizzes, exercises, and simulations within the content based on the AI analysis, ready for learner interaction. As learners interact with the content, the AI engine continually refines and adjusts the interactive elements to match the learner's evolving needs and preferences, iteratively prompting the educator to create additional material enhancements that may then be incorporated into the AI based educational platform. The Interactive Book Publishing Model establishes a new paradigm in e-learning, offering a deeply personalized and engaging learning experience that adapts to each learner's unique journey.

According to some embodiments, the AI Driven educational method includes a Generative AI Key Management and Payment System, which introduces an innovative approach to managing AI API keys and simplifies the payment processes associated with accessing AI-powered services, including those integral to the educational journey of students. This integrates seamlessly with the previously discussed e-learning platform components, ensuring secure, efficient, and user-friendly access to a wide range of AI-enhanced educational services and tools within the inventive system. By leveraging generative AI, this method dynamically generates and manages API keys, enhances security protocols, optimizes billing processes, and facilitates seamless integration with various payment gateways. This feature of the method implements advanced security measures, including encryption and access controls, to protect API keys, generated as detailed above, and sensitive transaction data, reducing the risk of unauthorized access and data breaches. This feature utilizes AI to analyze usage patterns and optimize billing, ensuring that users and organizations are charged accurately based on their actual usage of AI services, potentially leading to cost savings and more predictable expenses. This offers easy integration with leading payment gateways, simplifying the payment process for accessing premium AI services and content within the e-learning platform. According to embodiments, when a user or service requests access to AI-powered tools or content, the method dynamically generates a unique API key, granting secure access. The method continuously monitors API key usage, implementing security checks to prevent unauthorized access and automatically updating keys as needed to maintain high security levels. AI algorithms analyze service usage data to optimize billing, adjusting charges based on actual usage patterns and identifying opportunities for cost savings. This feature integrates with payment gateways to facilitate smooth transactions for accessing paid AI services, streamlining the payment process for users and ensuring timely revenue collection for service providers. This Generative AI Key Management and Payment System fundamentally transforms the accessibility and management of AI-powered educational tools, ensuring enhanced security, cost-efficiency, and user convenience, making it an integral part of the modern e-learning ecosystem.

Embodiments of the inventive AI Driven Education Method additionally include a Comprehensive Security and Data Protection Framework (CSDPF). The CSDPF is an essential component of some embodiments of the invention, designed to safeguard sensitive information, ensure privacy, and maintain the integrity of the e-learning platform. This framework incorporates advanced security measures, including data encryption, secure authentication mechanisms, access controls, and regular security audits to protect against unauthorized access, data breaches, and other cyber threats. By prioritizing the security and privacy of users, this component establishes a trusted and safe learning environment. The CSDPF utilizes state-of-the-art encryption technologies to secure data in transit and at rest, ensuring that sensitive information is protected against interception and unauthorized access. The method implements robust authentication protocols and access control measures to verify user identities and restrict access to information based on user roles and permissions. The method conducts regular security audits and compliance checks to identify vulnerabilities, enforce security policies, and ensure adherence to data protection regulations. The method adopts privacy-by-design principles, ensuring that user data is collected, stored, and processed with the utmost respect for privacy rights and in compliance with relevant legislation. All data transmitted between the user's device and the platform, as well as data stored on servers, is encrypted using advanced encryption standards. Users are authenticated through secure login processes, and access to data and platform features is controlled based on predefined roles and permissions. Regularly scheduled audits assess the platform's security posture, identify potential vulnerabilities, and implement remediation strategies to strengthen security measures. Privacy policies and practices are regularly reviewed and updated to ensure compliance with data protection laws, and users are informed about how their data is used and protected. This framework not only enhances the security and integrity of the e-learning platform but also fosters trust among users, making it a critical component for any digital education solution.

While several steps performed by an inventive process and a non-transitory system involve one or more abstract ideas, the present invention as a whole includes aspects that amount to significantly more than the abstract idea. Indeed, aspects of the present invention have never been previously performed in manual or digital form prior to the present invention. As recitations of using a non-transitory computer medium to implement an AI Driven educational method and method. These aspects of the present invention as an ordered combination, amount to significantly more than simply organizing and comparing data by addressing the institutional challenges of education and teaching. Embodiments of the inventive method and method provide educators, learners, and administrators with instant access to real-time information regarding the engagement and knowledge acquisition and mastery of learners, the effectiveness of educators and various materials, as well as suggestions for improvements, leading to a highly customized AI driven educational platform.

The suite of cloud-based apps and networked apps are fully designed to work with legacy IT systems. The apps and infrastructure to support these tools are built with the following attributes:

Secure cloud-based application servers

Stacks that feature real-time data replication, which makes the platform ultra-scalable and reliable Use of well-supported open source solutions for unrestricted use of inventive platform from any third-party licensing or support issues.

Support for SaaS based models for smaller customers and an Enterprise model for larger customers Web app support for modern desktop and mobile browsers including Chrome, Internet Explorer, Firefox, and Safari Native app support for mobile and desktop devices including those operating on the iOS, Android, Windows, Mac OSX, and Chrome OS platforms Allows use on mobile devices in non-native mode [Does not require use of app stores for distribution]

API to integrate features into custom applications

Feature rich reporting and analytics

Simple web-based user administration

Embodiments of the inventive app utilize a responsive user interface (UI). Additional aspects and features of the app and UI include:

Secure login

Built in search capabilities

Secured access may be provided to authorized users outside the system-information continuity UI and app may be customized for client's need and/or private labeled Fast view dashboard progress Production of action plans The capability of capturing notes/comments Additional capabilities of embodiments of the inventive platform and app include reporting capabilities. A report generator and a statistical analysis module to generate reports is part of the platform.

As a person skilled in the art will recognize from the previous detailed description and from the figures and claims, modifications and changes can be made to the preferred embodiments of the invention without departing from the scope of this invention defined in the following claims.

The invention claimed is:

1. A method for providing personalized and customizable educational content, the method comprising:
   a computer system comprising a program application, secure data storage in non-transient memory, and a learner networked computer or a learner cloud-based mobile device having a learner portal and capturing a learner's initial learning preferences, styles, Artificial Intelligence (AI) interaction and knowledge;
   generating an AI Key unique to the learner through the computer system based on input as to at least one of learner study habits, acquired knowledge, and preferred learning styles through a series of survey questions, computational observations, or a combination thereof;
   gathering explicit information about the preferred learning style, interests including specific subjects or topics, skill levels including existing knowledge or proficiency in the specific subjects or topics, performance data from assessments and quizzes to gauge mastery and areas for improvement;
   interacting via AI prompts to gather the learning styles of the learner, the learning styles being verbal-linguistic, logical-mathematical, spatial, musical, bodily-kinesthetic, interpersonal, intrapersonal, naturalistic intelligence, or a combination thereof;
   presenting via the learner networked computer or the learner cloud-based mobile device, the learner with educational material from an educator, by way of an educator networked computer or an educator cloud-based mobile device of the computer system, the educator networked computer or the educator cloud-based mobile device having an educator portal, the educator portal comprising graphical user interface, wherein the educator sets up an educator profile within the system using a username and password and thereafter sets up a course section for each course taught by the educator, the educator profile comprises a list of learners participating in a given course taught by the educator;

dynamically updating, via the program application, the AI Key based on continuous learner interactions with the educational material and the learner's progress in mastering the educational material and changes to the learner's initial learning preferences via the computer system using inputs of behavior of the learner to infer additional preferences and learning patterns, the inputs including at least one of type of content engaged, time spent on different activities, and performance metrics from quizzes or assessments to generate Knowledge Concept Graphs (KCG) and Cognitive Blueprints (CB);

utilizing the AI Key to inform AI-driven educational tools and services and an educator about the learner's personalized learning profile;

sharing the KCG and CB for the learner with the educator through the educator portal and allowing the educator the option to update the AI key based on the KCG and CB and override computer system updates to the AI key; and iteratively updating the educational material using the AI-driven educational tools and services and the educator's input to tailor the updated educational material to the learner based on the dynamically updated AI key.

2. The method of claim 1 wherein the educational material is generated by the educator alone or with the assistance of AI.

3. The method of claim 1 further comprising prompting the educator to create or provide additional educational content tailored to the learner's personalized learning profile, the learner's interactions with the educational material, and the learner's progress.

4. The method of claim 3 wherein prompting the educator to create or provide additional educational content includes suggestions for additional educational content based on the AI-driven educational tools and services.

5. The method of claim 1 further comprising facilitating the transfer of the personalized AI Key to a different educational platform.

6. The method of claim 1 further comprising employing predictive analytics to customize future learning content and interventions tailored to the learner.

7. The method of claim 6 wherein the future learning content and interventions are provided to the educator for review and refinement before being provided to the learner.

8. The method of claim 1 further comprising dynamically updating the knowledge concept graph and the cognitive blueprint based on the learner's interactions with the educational material and the learner's progress.

9. The method of claim 1 further comprising providing access to the learner's knowledge concept graph cognitive blueprint with the learner.

10. The method of claim 1 further comprising collecting data on learner engagement with the educational material, assessment results indicative to learner mastery of the educational material, and direct feedback from the learner and the educator.

11. The method of claim 10 further comprising analyzing the data using artificial intelligence to determine the educational material's effectiveness in improving learning outcomes.

12. The method of claim 11 further comprising calculating compensation for the educator based on the analysis of the data, where compensation is directly tied to the effectiveness in improving learning outcomes of the educational material.

13. The method of claim 1 wherein the educational material includes a digital book embedded with interactive elements including multimedia, quizzes, exercises, and simulations.

14. The method of claim 13 further comprising adjusting the embedded interactive elements in real-time based on the learner's interactions and performance analytics.

15. The method of claim 13 further comprising prompting the educator create additional interactive elements based on the learner's interactions and performance analytics.

16. The method of claim 1 wherein the AI key further comprises inputs as to engagement patterns and learning schedules of the learner.

17. The method of claim 1 wherein the AI key further comprises inputs as preference of the leaner for concise articles over longer texts, interactive simulations over traditional lectures, or a combination thereof.

18. The method of claim 1 wherein the AI key is continuously updated in real-time.

19. The method of claim 1 wherein the computer system offers tailored feedback based on performance and engagement patterns of the learner with an option for the learner to reject the tailored feedback.

20. A non-transitory computer-readable medium for providing personalized and customizable educational content comprising instructions stored thereon, that when executed on a processor, perform the steps of:
capturing a learner's initial learning preferences, styles, and knowledge;
generating an AI Key unique to the learner based on input as to at least one of learner study habits, acquired knowledge, and preferred learning styles through a series of survey questions;
gathering explicit information about the preferred learning style, interests including specific subjects or topics, skill levels including existing knowledge or proficiency in the specific subjects or topics, performance data from assessments and quizzes to gauge mastery and areas for improvement;
interacting via AI prompts to gather the learning styles of the learner, the learning styles being verbal-linguistic, logical-mathematical, spatial, musical, bodily-kinesthetic, interpersonal, intrapersonal, naturalistic intelligence, or a combination thereof;
presenting the learner with educational material from an educator, by way of an educator networked computer or an educator cloud-based mobile device of the computer system, the educator networked computer or the educator cloud-based mobile device having an educator portal, the educator portal comprising graphical user interface, wherein the educator sets up an educator profile within the system using a username and password and thereafter sets up a course section for each course taught by the educator, the educator profile comprises a list of learners participating in a given course taught by the educator;

dynamically updating the AI Key based on continuous learner interactions with the educational material and the learner's progress in mastering the educational material and changes to the learner's initial learning preferences via the computer system using inputs of behavior of the learner to infer additional preferences and learning patterns, the inputs including at least one of type of content engaged, time spent on different activities, and performance metrics from quizzes or assessments to generate Knowledge Concept Graphs (KCG) and Cognitive Blueprints (CB);

utilizing the AI Key to inform AI-driven educational tools and services and an educator about the learner's personalized learning profile;

sharing the KCG and CB for the learner with the educator through the educator portal and allowing the educator the option to update the AI key based on the KCG and CB and override computer system updates to the AI key; and iteratively updating the educational material using the AI-driven educational tools and services and the educator's input to tailor the updated educational material to the learner based on the dynamically updated AI key.

* * * * *